(12) United States Patent
Demin (10) Patent No.: US 6,764,634 B2
(45) Date of Patent: Jul. 20, 2004

(54) METHOD FOR MOLDING A SUPPORT (75) Inventor: Stephane Demin, l'Isle d'Abeau (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 128 days.

(21) Appl. No.: 09/922,386

(22) Filed: Aug. 3, 2001

(65) Prior Publication Data

US 2002/0043317 A1 Apr. 18, 2002

Related U.S. Application Data (60) Provisional application No. 60/225,167, filed on Aug. 14, 2000.

(30) Foreign Application Priority Data

Aug. 3, 2000 (FR) .............................. 00 10291

(51) Int. Cl.[7] .............................................. B29C 45/14
(52) U.S. Cl. ........................................ 264/275; 264/334
(58) Field of Search ................................. 152/516, 520; 264/259, 265, 271.1, 275, 326, 334; 425/121, 126.1, 129.1, 556; 249/63, 83

(56) References Cited

U.S. PATENT DOCUMENTS

| | | | |
|---|---|---|---|
| 4,160,007 A | * 7/1979 | Pizzorno ..................... 264/334 |
| 4,177,027 A | * 12/1979 | Grawey et al. ................ 425/49 |
| 4,732,726 A | 3/1988 | Grannen, III .......... 264/272.21 |
| 5,449,483 A | * 9/1995 | Greenwood et al. ........ 264/155 |
| 5,551,763 A | * 9/1996 | Alsman .................. 301/64.706 |
| 5,891,279 A | 4/1999 | Lacour ....................... 152/520 |
| 6,224,808 B1 | * 5/2001 | Essinger et al. ............ 264/221 |
| 6,387,311 B1 | * 5/2002 | Lacour et al. .............. 264/229 |

FOREIGN PATENT DOCUMENTS

| | | |
|---|---|---|
| EP | 1000728 | 5/2000 |
| JP | 6328502 | 11/1994 |

* cited by examiner

Primary Examiner—Angela Ortiz
(74) Attorney, Agent, or Firm—Baker Botts L.L.P.

(57) ABSTRACT

A method and a device for molding a support around a prefabricated circumferential reinforcing belt. The prefabricated belt, intended to be integrated with a support on a given molding cycle, is inserted in the mold before the support molded during the preceding molding cycle has been removed. These two operations can be carried out with a single handling tool which is synchronized with the opening and closing operations of the mold to introduce the reinforcing belt and to remove the molded support.

6 Claims, 4 Drawing Sheets

METHOD FOR MOLDING A SUPPORT

This application is entitled to the benefit of the priority of provisional application Ser. No. 60/225,167, filed Aug. 14, 2000.

BACKGROUND OF THE INVENTION

The present invention relates to the manufacture of elastic belts as supports used inside tires to bear the load in case of a flat. More precisely, it concerns the methods and means of manufacture of supports embodying at their base an appreciably inextensible belt made by means of reinforcing wires of the type used in reinforcing tires.

In the present description, the term "wire" very generally designates both monofilaments and multifilaments or assemblies such as cords, cables, plied yarns or alternatively any equivalent type of assembly, whatever the material and the treatment of these wires. They may, for example, be surface treatments, coating or pre-sizing in order to promote adhesion to the associated molding material.

Patent application EP 0,796,747 describes such supports and patent application EP 1,000,728 describes a particular method of manufacture of such supports.

The method described in patent application EP 1,000,728 consists of molding a support in a molding cavity where a flexible circumferential reinforcing belt has been previously arranged. That belt is thus integrated with the molding material and is intended to bestow certain mechanical properties to the support formed. The device described in document EP 1,000,728 comprises a molding cavity placed around a roughly cylindrical core, the circumference of which can vary between a molding configuration where the diameter of the core matches the reference diameter of the support and a reduced configuration (of so-called mold stripping) where the circumference is less than the product of the reference diameter and the number π. The principal stages of manufacture are as follows:

- a belt (prefabricated in any appropriate manner), containing the reinforcing wires, is deposited around the core in its reduced configuration (mold stripping configuration),
- the core molding configuration (reference diameter) is established,
- the mold is closed,
- the mold is filled under pressure (by injection or transfer),
- the mold is opened,
- the molded support is extracted.

This known method includes several stages, which constitute a relatively long manufacturing cycle. The time necessary for filling of the mold and reticulation of the molded material is variable, depending mainly on the material used for molding, the different regulating temperatures and the general dimensions of the support, but especially on the local thicknesses of the different parts of the support. In particular, the time necessary for sufficient reticulation of the molded material (for a resistance compatible with the mold stripping and handling stresses), represents a large and irreducible portion of the cycle time. For example, in the case of a support made of rubber, its reticulation takes several minutes. Another large portion of the cycle time corresponds to the operations of molding preparation and removal of the molded support. In fact, placement of the reinforcing belt before the molding operation is difficult, for its proper positioning in relation to the molding cavity has to be assured. Extraction of the support after molding is likewise difficult and requires a considerable effort on the part of the operator, especially in case of large dimensions. Those operations are therefore relatively lengthy and require a consequent immobilization of the production equipment. Furthermore, the mold being naturally open during handling, a considerable heat exchange takes place and tends to cool the mold, which retards the reticulation of the following molding. Likewise, if those operations are carried out manually, this demands an availability of labor at precise moments of the manufacturing cycle in order not to further penalize productivity of the machine with extra waiting time. If placement of the belt in the mold is carried out manually by the person who had just undertaken extraction of the support molded on the previous cycle, that person must first deposit the finished support before being able to grab hold of a reinforcing belt and position it inside the mold, this again constituting a nonproductive machine time. On the other hand, the generally high temperature of the molds also complicates these operations.

Owing to the duration and variability of that immobilization time and, therefore, of opening of the mold, temperature regulation of the different parts of the mold is rendered complex. In fact, if that duration is variable, the natural cooling of the walls of the mold also becomes variable.

SUMMARY OF THE INVENTION

One objective of the invention is to make it possible to reduce the average duration of a manufacturing cycle in relation to the known method. Another objective of the invention is to reduce the dependence of the process on availability of labor, particularly in order to render performance of the manufacturing equipment more efficient and more consistent, which also results in greater uniformity of production and, therefore, potentially better manufactured quality control. A further objective of the invention is to make press loading and unloading operations possible without having to extract the mold or a portion of same from the press. Another objective of the invention is the most compact possible means of using ordinary presses and not those specifically dimensioned for that application. A further objective of the invention is a method and device making possible substantial if not total automation of production.

The method and device of the invention make it possible to attain these different objectives and others which will appear on the description of preferred embodiments.

The invention consists of a method of manufacture of a support intended to be mounted on a tire rim of a vehicle, said support having an axis A, a base limited by a roughly cylindrical radially inner face intended to be mounted on said rim, a crown intended to bear the load and a body joining said base to said crown, said base comprising a substantially inextensible circumferential reinforcement, said body containing a plurality of roughly axial recesses coming out of said support on at least one side, said manufacturing process using a mold of axis corresponding to said axis A and the said mold comprising:

- an inner core for molding said radially inner face,
- a crown molding ring, said ring comprising at least two component parts radially mobile relative to each other, the said component parts making it possible to mold a radially outer face of said crown,
- at least one shell bearing a plurality of axial fingers for laterally molding said body and said recesses, said core, said ring and said shell cooperating in order to define, at least in part, a closed molding cavity for molding said support, the said core, comprising at least two component parts and being capable of taking a molding configuration in which said component parts form a circumferentially continuous molding surface for molding said radially inner face, the molding surface being defined by a reference diameter φ, corresponding to the inner diameter of said support, the said core also being capable of taking a mold stripping configuration, defined by an overall length E around said molding surface less than the product of the number π and the reference diameter φ, and said manufacturing process comprising the following stages:

establishing the mold stripping configuration of the core, placing a belt containing the said circumferential reinforcement around said core, establishing the molding configuration of said core, closing the mold, forcing an injectable material under pressure into said molds, opening the mold, establishing the mold stripping configuration of said core, removing said molded support, the said process being characterized in that, on a given manufacturing cycle, the said belt is introduced in a volume described by the opening motion of said mold before a support molded on a previous manufacturing cycle is removed from said mold.

The method of the invention is, furthermore, preferably characterized in that, in a given manufacturing cycle, said belt is placed around said core before a support molded on a previous manufacturing cycle is removed from said mold.

The method of the invention is, furthermore, preferably characterized in that, the said axis of said mold being roughly vertical, said core, said shell and said ring having relative motions along said ax is on opening of the mold, said molded support is maintained, after its molding, after opening of the mold and before its removal, in contact with at least one wall of said molding cavity and in a vertically higher position than a mid-plane of said volume described by said opening motion.

The method of the invention is, furthermore, preferably characterized in that, said belt being introduced by means of a handling tool, the support molded on said previous cycle is removed by means of said handling tool.

The method of the invention is, furthermore, preferably characterized in that the stage of introduction of said belt and the stage of removal of said molded support are carried out by a roughly horizontal displacement of said handling tool.

The invention also relates to a device for the manufacture of a support designed to be mounted on a vehicle tire rim, said support having an axis A, a base limited by a roughly cylindrical radially inner face intended to be mounted around said rim, a crown intended to bear the load and a body joining said base to said crown, said base comprising a substantially inextensible circumferential reinforcement, the body containing a plurality of roughly axial recesses coming out of said support on at least one side, said device comprising a mold of axis matching said axis A and the said mold comprising:

an inner core for molding said radially inner face, a crown molding ring, said ring comprising at least two component parts radially mobile relative to each other, the said component parts making it possible to mold a radially outer face of said crown, at least one shell having a plurality of axial fingers for laterally molding said body and said recesses, said core, said ring and said shell cooperating in order to define, at least in part, a closed molding cavity for molding said support, the said core comprising at least two component parts and being capable of taking a molding configuration in which said component parts form a circumferentially continuous molding surface for molding said radially inner face, the molding surface being defined by a reference diameter φ roughly corresponding to the inner diameter of said support, the said core also being capable of taking a mold stripping configuration, defined by an overall length E around said molding surface less than the product of the number π and the reference diameter φ, the said device being characterized in that each of the elements of an assembly consisting of said ring, said shell and said core is axially mobile relative to the other elements of said assembly.

The device of the invention is, furthermore, preferably characterized in that the said axis of said mold is roughly vertical.

The device of the invention is, furthermore, preferably characterized in that, at least a part of said mold being roughly stationary, other parts of said mold being movable along the axis of the mold, said device makes possible a movement of said moving parts directed downward in order to open the mold.

The device of the invention is, furthermore, preferably characterized in that, said mold comprising two shells capable of laterally molding the respectively opposite axial faces of said body, said shells bearing fingers capable of molding the said recesses, the said fingers of a shell capable of molding a face of said body are circumferentially interposed between the said fingers of a shell capable of molding the opposite face.

The device of the invention is, furthermore, preferably characterized in that it comprises a handling tool capable of being displaced in a roughly horizontal plane, said handling tool being capable of introducing said circumferential reinforcing belt and of removing said molded support.

The device of the invention is, furthermore, preferably characterized in that, the handling tool having a plurality of roughly vertical and radially mobile contact surfaces, the said handling tool is capable of radially maintaining said belt in a roughly cylindrical configuration, capable of positioning said belt in the axis of the mold and capable of receiving said molded support.

The device of the invention is, furthermore, preferably characterized in that, the handling tool having means of radial retention of said belt against said contact surfaces, said means are source of low pressure placed within said contact surfaces.

The device of the invention is, furthermore, preferably characterized in that, said handling tool having a generally horizontal upper face capable of bearing said molded support, said molded support is, on its removal, maintained relative to said handling tool by forces of gravity.

The method of the invention can be applied to the manufacture of supports from any injectable material, that is, capable of being introduced under pressure into the cavity of a mold. Such a material can consist of a reticular rubber compound or a thermoplastic polymer-base or thermosetting polymer-base compound, such as a thermosetting polyurethane.

A compound with base of at least one diene elastomer is preferably used as reticular rubber compound. A diene elastomer is understood, as known, to be an elastomer originating at least in part (i.e., a homopolymer or a copolymer) from diene monomers (monomers carrying two carbon—carbon double bonds, conjugated or not).

After entrance into the mold, the injectable material acquires the final mechanical characteristics necessary for operation. In the case of an elastomer or thermosetting material, that modification will be occasioned by a reticulation. With a thermoplastic material, the final mechanical characteristics are obtained by cooling.

In the description which follows, the case of manufacture of a support consisting of a reticular rubber compound is mainly illustrated. The description and drawings are directed to preferred embodiments of the invention.

DESCRIPTION OF PREFERRED EMBODIMENTS

Figure 1:
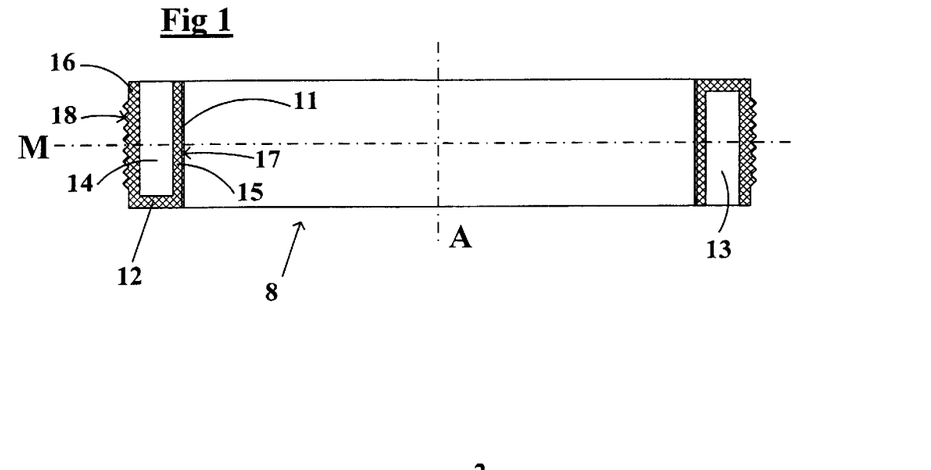
FIG. 1 shows an example of a support made according to the method of the invention.

FIG. 1 represents a view in section of a support 8 which can be obtained by the method of the invention or by that described in document EP 1,000,728. The support 8, of annular general shape and of axis A, consists of a base 15 and a crown 16 joined by a body 12. The radially inner surface 17 of the base 15 is intended to be fixed on the tire rim of a vehicle. The base 15 comprises a practically inextensible circumferential reinforcing belt 11, the function of which is to keep the support tight on the rim. The crown 16 of the support 8 contains a radially outer surface 18 capable of bearing on the tire crown in order to bear the load in case of pressure loss in the tire. The radially outer surface 18 can contain, as is the case in this example, grooves and bosses. Axial recesses 13, 14 are provided in the body 12 along its circumference. The example represented here contains an alternation of recesses 13 opening toward the bottom of the figure and recesses 14 opening toward the top of the figure. Thus, the support 8 presented here is roughly symmetrical relative to its mid-plane M. Other configurations are possible, for not all the characteristics of the support 8 (as will be understood in the description of the following figures) are decisive in terms of molding process, although it generally entails the use of a specific mold.

Figure 2:
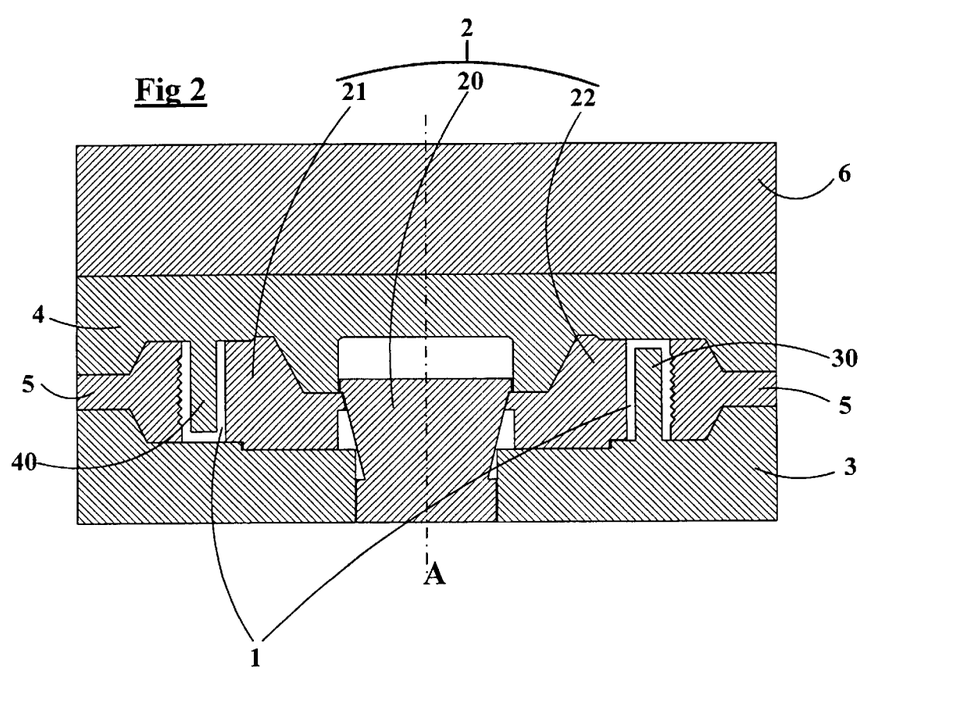
FIG. 2 is a mold, according to a preferred embodiment of the invention, installed in an injection press and shown in closed configuration.

In FIG. 2, a mold adapted to manufacture of the support of FIG. 1, according to a preferred embodiment of the invention, is represented in section in closing configuration. That mold of axis A can be installed, for example, in a vertical injection press. The molding cavity 1 is shown in the form of fabrication of the support 8 presented above. That cavity 1 is defined by the molding surfaces of a core 2 and other parts, which are a movable shell 3, a stationary shell 4 and a crown molding ring 5 molding the bearing surface 18, situated radially outside the support 8. Considering the grooves and bosses that it is desired, in this particular example, to mold on the bearing surface 18, the crown molding ring 5 consists of a plurality of parts, capable of radially separating from one another in order to facilitate mold stripping. The stationary shell 4 and movable shell 3 are represented here in one piece, but can in practice consist of a plurality of segments.

The core 2 consists of several parts. Three parts 20, 21, 22 are represented in this view, but other devices, described, for example, in document EP 1,000,728, are usable, provided that it is possible to vary the molding circumference in a proportion allowing both placement of the circumferential reinforcement and mold stripping of the finished product. In this example, an axial movement of the center part 20 can control a radial movement of the parts 21 and 22 constituting the molding surface.

In order to mold the recesses 13, 14 of the support 8, the mold has fingers 40 protruding from the stationary shell 4 and fingers 30 protruding from the movable shell 3. Some of those fingers can contain an ejector, that is, an axially moving part which can contribute to mold stripping, when its extension is controlled. As a result of the presence of the fingers 30, 40, the base 15 of the support 8 has a rather narrow radial thickness (typically less than 15 mm), measured between said radially inner face 17 and any of the recesses. On injection (or transfer), the flow of injected material is confined between the fingers 30, 40 and the reinforcing wires placed along the radially inner wall of the molding cavity. A convenient technique consists of prefabricating a belt 11 containing the circumferential reinforcements that it is necessary to incorporate in the base 15 of the support (see, for example, document EP 1,000,728). That belt 11 can be very flexible, which renders its correct installation in the mold difficult.

Alternatively, the belt 11 can comprise a circumferential metal sheet replacing partially or totally the reinforcing wires.

The core 2 is capable of taking a molding configuration in which the component parts form a circumferentially continuous molding surface, an exact image of the final shape of fabrication of the radially inner surface 17 of the base 15 of the support 8. That molding configuration is characterized by a reference diameter φ corresponding to the inner diameter of said support. On the other hand, when the mold is at least partially open (see also FIG. 4), that is, when the stationary shell 4 is no longer in contact with parts 21 and 22 of the core 2, the core 2 is also capable of taking a mold stripping configuration, characterized by the overall length of the parts 21, 22 constituting the molding surface less than the product of the reference diameter φ and number π.

Element 6 can be a block with regulated channels (known per se) ensuring the supply of injectable material at a controlled temperature. For example, for the fabrication of rubber supports, the material can be conveyed to the mold at a temperature of approximately 80° C. (temperature at which the material remains sufficiently fluid), while the temperature of the mold is regulated to around 160° C. for a relatively rapid reticulation. The use of such a block 6 with regulated channels is not essential for the method of the invention, but it does make possible a reduction of material losses compared to direct supply.

The press is endowed with a mechanism capable of imparting axial motions of separation and relative coming together of the stationary shell 3, moving shell 4 and ring 5. That motion of separation and relative coming together makes possible not only the closing and opening of the mold, but it can also control the specific movements of the core 2 and the radial opening of the rings 5 by well known transmission devices.

The radially inner face 17 of the base 15 of the support 8 can contain one or more anchoring means provided to ensure the positioning of the support on the rim. Those means can, for example, take the shape of a relief of several millimeters, annular or consisting of several discrete elements along the circumference of the inner face 17. Those shapes are then encountered negatively on the molding surface of the core 2 and require specific conditions for mold stripping.

The figures describe a device, the top of which is connected to the entry channels for the injectable material. Under those conditions, the top of the mold is preferably stationary and the bottom movable in order to open the mold, in that case, downward. That arrangement is of interest for certain particular aspects like simplicity of the handling device, as will be seen below in the description. However, the principle of the invention does not stand in the way of a reverse arrangement, in which the bottom would be stationary and the top movable.

A preferred embodiment of the method of the invention will now be described step by step by means of FIGS. 3 to 14.

Figures 3, 6:
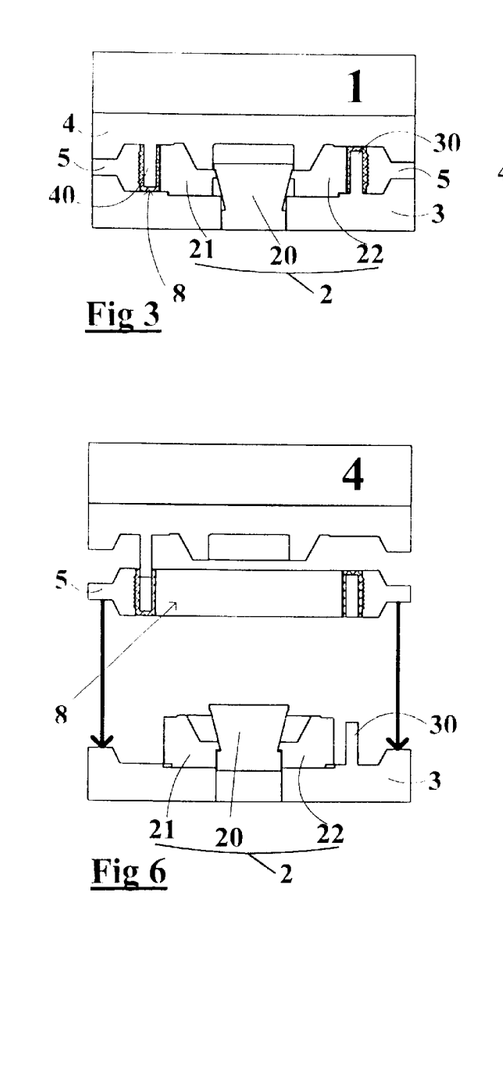
FIGS. 3 to 14 show the different stages of a preferred embodiment of the method of the invention.

FIG. 3 repeats the diagram (simplified) of FIG. 2 and shows the molding stage of the support 8 that is chosen for the description as step 1 (the number of each step appears very legibly on the upper right-hand corner of each figure). That choice is, of course, arbitrary, since the method to be described is repeated practice ad infinitum on current production. At this step, the mold is closed, the injectable material has been admitted inside the mold and its reticulation is in progress.

Step 2 (in FIG. 4) consists of the partial opening of the mold. In order to do so, the stationary shell 4 is separated from the molded support 8 and from the other elements of the mold by moving downward the assembly comprising the finished support 8, the core 2, the crown molding ring 5 and the movable shell 3. The vertical arrows pointed downward symbolize that movement. The fingers 40 integral with the stationary shell 4 are partially or totally disengaged depending on the amplitude of the movement. A partial mold stripping, as on that figure, can improve the provisional retention of the support in the crown molding ring 5 and thus facilitate continuation of the process. That step 2 can be started off as soon as the molded support 8 is able to withstand that first mold stripping operation, that is, as soon as its state of reticulation enables it to tolerate the mechanical stresses associated with mold stripping.

Step 3 (in FIG. 5) consists of reduction of the core entailing its mold stripping. The arrows clearly show that a vertical movement of the center element 20 makes it possible to control a radial movement of the parts 21 and 22 constituting the molding surface. Typically, reduction of the diameter (more exactly, of the overall length) of the core is in the order of 10 mm. Just a portion of that reduction can suffice to make mold stripping possible. Under some conditions (see document EP 1,000,728 for more detail), mold stripping can even be carried out without prior reduction. That can then make it possible to combine this step with the following one.

Step 4 (in FIG. 6) consists of mold stripping of the movable shell 3 and of the fingers 30 connected to the latter. In order to do so, the movable shell 3 is separated from the molded support 8 and from the crown molding ring 5 by moving downward the assembly comprising the core 2 and the movable shell 3. The vertical arrows pointed downward symbolize that movement. The amplitude of that movement depends especially on the height necessary for the following stage. The molded support 8 is kept fixed on the stationary shell 4 by the crown molding ring 5.

Step 5 (in FIG. 7) consists of introduction of the circumferential reinforcing belt 11 in the volume described by opening of the mold. That belt is kept in a generally circular configuration by a handling tool 10 (which will be more precisely described below). The tool 10 (and therefore the belt 11) is positioned in the axis of the mold, in a plane situated between the molded support 8 and the assembly comprising the core 2 and the movable shell 3. The molded support 8 remains fixed relative to the stationary shell 4 by the crown molding ring 5.

Step 6 (in FIG. 8) consists of placement of the circumferential reinforcing belt 11, still held by the handling tool 10, in the mold, that is, around the core 2. That operation, as shown by the vertical arrows, is carried out by raising the assembly comprising the movable shell 3 and the core 2. The molded support 8 is kept fixed relative to the stationary shell 4 by the crown molding ring 5. The handling tool 10 can then be separated from the belt 11 which comes to rest against the mold under the effect of its own weight.

Step 7 (in FIG. 9) consists of the radial extension of parts 21 and 22 of the core 2 in order to lock the circumferential reinforcing belt 11 in place against the molding wall. By reason of its insufficient rigidity, for example, the belt 11 can alternatively be retained by the handling tool 10 until the core 2 is partially or totally deployed. The previously molded support 8 still remains fixed in relation to the stationary shell 4 by the crown molding ring 5.

Step 8 (in FIG. 10) consists of disengagement of the handling tool 10. This is achieved by lowering the assembly comprising the core 2 and the movable shell 3. The molded support 8 still remains fixed in relation to the stationary shell 4 by the crown molding ring 5.

Step 9 (in FIG. 11) consists of depositing the molded support 8 on the upper face of the handling tool 10. This is accomplished by a descending motion of the crown molding ring 5 (which carries out, if necessary, mold stripping of the fingers 40), and then by radial opening of the ring. Two separable parts 5a, 5b have been represented here, but that number constitutes the minimum necessary for opening and a greater number can be chosen, for example, to facilitate mold stripping. Steps 8 (FIG. 10) and 9 (FIG. 11) can be carried out practically simultaneously, provided that the crown molding ring 5 is opened only when the handling tool 10 is sufficiently disengaged from the belt 11 for the latter not to be damaged by the support 8 or by a displacement of the handling tool 10 produced by the support 8.

Step 10 (in FIG. 12) consists of return of the ring 5 to molding position, or at least to a position making possible the disengagement of the handling tool 10 carrying the support 8. Let us remember that the circumferential reinforcing belt 11 is maintained in position around the core pending the following molding cycle.

Step 11 (in FIG. 13) consists of removal of the handling tool 10 carrying the finished support 8. Gravity is sufficient to keep the support in place on the handling tool 10, especially if its upper face contains any retention means.

Step 12 (in FIG. 14) consists of complete closing of the mold. The molding cavity 1 is closed and the injectable material constituting the support can be admitted under pressure; when the admission phase is carried out, the manufacturing cycle is precisely in the situation of step 1 (FIG. 3).

Figure 15:
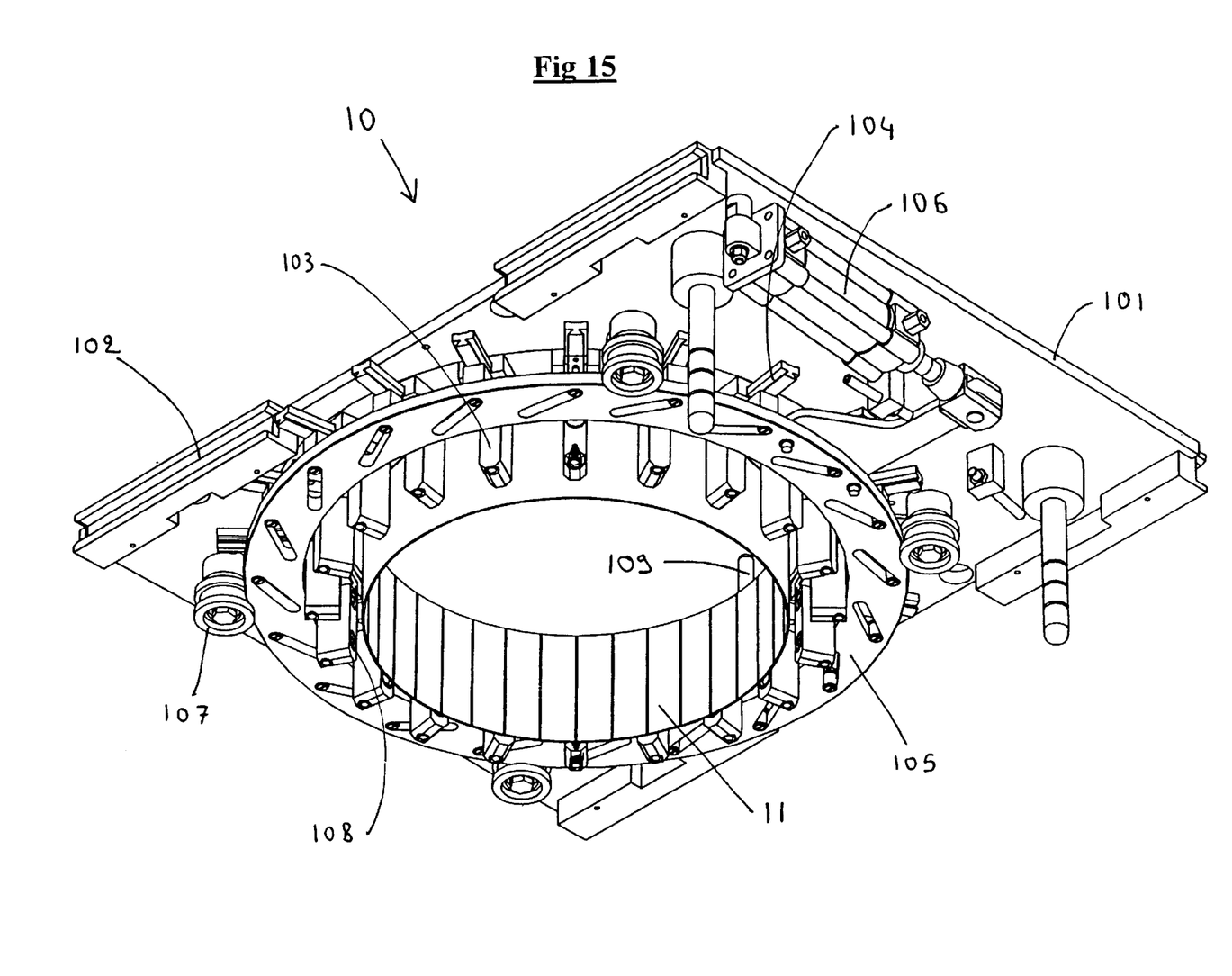
FIG. 15 is a view in perspective of an embodiment of the handling tool.

FIG. 15 shows a bottom view of a handling tool 10 capable of being used within the device of the invention. It comes in the form of a platform 101 equipped with slide rails 102 making possible a horizontal translation between its two main positions, which are a working position in the volume described by opening of the mold and a loading/unloading position outside the press where the molded support is unloaded and where a reinforcing belt 11 is loaded in the handling tool 10, in order to be introduced in the mold in the following production cycle. The belt 11 is held, in roughly cylindrical configuration, by the contact surfaces of the carriages 103. Those carriages 103 are connected to the platform 101 by dovetail guides 104 making possible their radial motion. The radial position of the carriages 103 is controlled by slugs sliding in the slots of a rotary disk 105. That rotary disk 105 is guided by rollers 107 and its angular position is controlled by a pneumatic jack 106. A simple change of disk 105 makes it possible to change the manufacturing dimension (within the limits of the possible course of the dovetail 104).

Radial holding means can be present to reinforce the retention of the belt 11 against the contact surfaces of the carriages 103. For example, in the case of a belt prefabricated by calendaring of rubber around reinforcing wires, the ply constituting the belt being appreciably tight, the low pressure sources 108 can be recessed within the carriage contact surfaces. Good belt holding means can then make it possible, for example, to reduce the number of carriages necessary. For example, the low pressure sources 108 can be vents connected to a vacuum pump.

If, on the other hand, the prefabricated belt contains only reinforcing wires (for example, held together by weft), it is then porous and insensitive to low pressure. In that case, its resistance has to be ensured solely by radial adjustment of the carriages 103.

Of course, other radial holding means can be used to reinforce radial retention of the belt in the handling tool 10. That function can be performed, for example, by magnetic attraction in the case of a support containing metal reinforcements.

The contact surfaces of carriages 103 are slick in this example but they can bear protrusions to improve grip with the belt 11. Alternatively, those contact surfaces can be provided with vertical axis rollers for better centering of the belt when the handling tool takes up its closed configuration.

In FIG. 15, in order to visualize the low pressure sources 108 better, the handling tool 10 is represented in its open configuration, that is, the belt 11 is not maintained under those conditions. That open configuration is the one the handling tool 10 can have starting from stage 8 of the process described above.

A part 109 protruding on the upper face of the platform 101 can also be seen. That part, which bears, for example, in one of the recesses 13 of the support or outside or inside the support, when the latter rests on the upper face of the platform 101, makes it possible to limit the movement of the molded support 8, particularly on opening of the crown molding ring 5 (step 9, FIG. 11) and on removal of the support. A single part 109 can be seen here, but the handling tool 10 can contain a plurality of them. The presence of that part (or of those parts) is not essential to the device of the invention, but it does make it possible to guarantee a relatively precise position of the support on the handling tool 10.

As is understandable by comparing FIG. 15 to the preceding figures, the carriages 103 are introduced between the fingers 30 connected to the movable shell 3. However, their number can differ from that of the fingers 30. Depending on the weight, the surface state and the rigidity of the belts, the spacing and, therefore, the number of those carriages 103 can be adjusted in order to be limited to a minimum number ensuring good retention of a given type of belt. For example, if the movable shell 3 contains 20 fingers, the handling tool 10 can likewise contain 20 carriages, but also 10, 5 or 4 or any other number less than 20, as needed. If they exist, the radial holding means (extra) can be present on each carriage 103 or on just a certain number of them. It is easily understandable that the expert will know how to adapt these different measures to the particular case comprised by each type of production (dimensions, materials, laying precision sought, etc.).

Figures 4, 7:
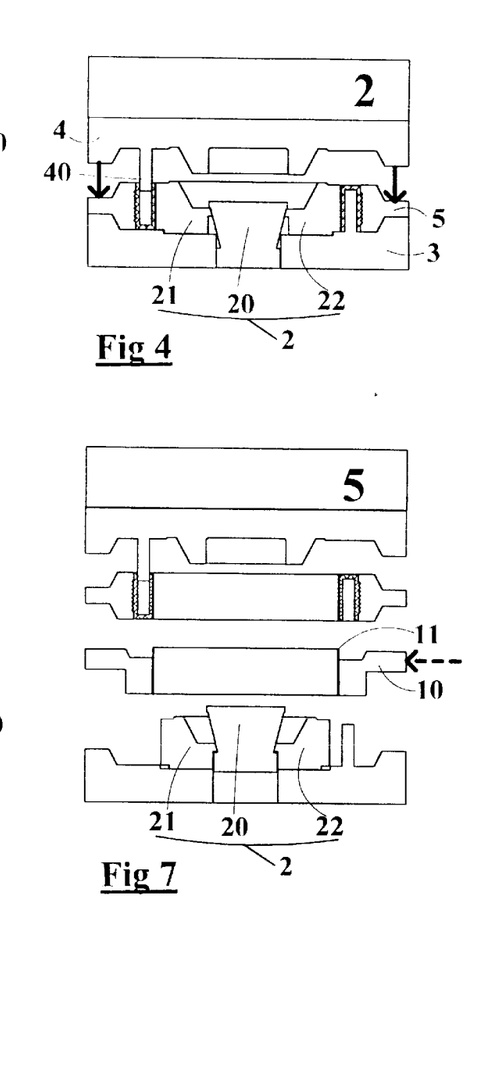
Figures 5, 8:
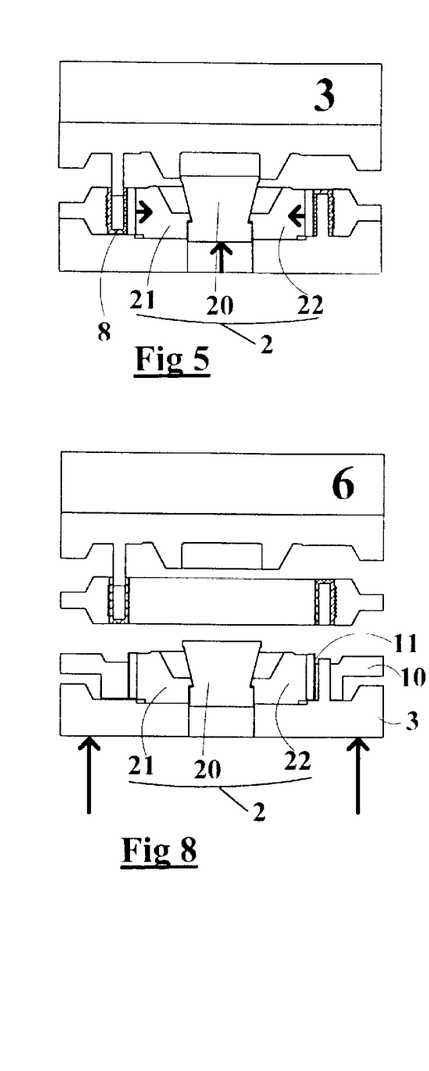
Figure 9:
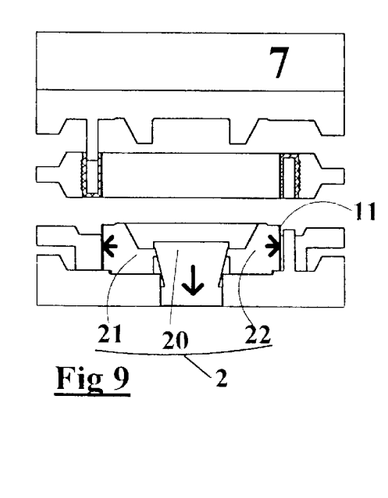
Figure 10:
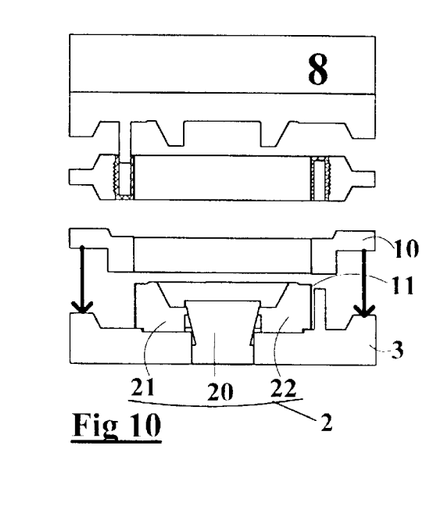
Figure 11:
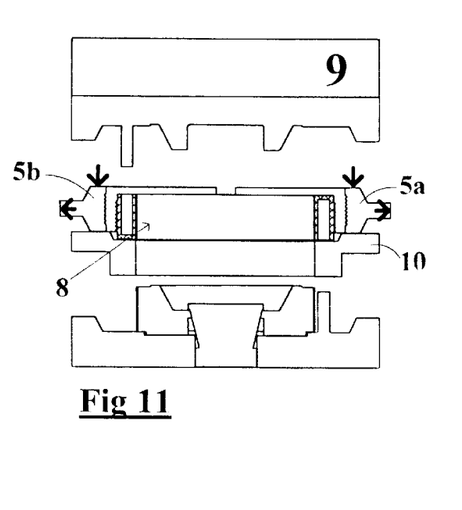
Figure 12:
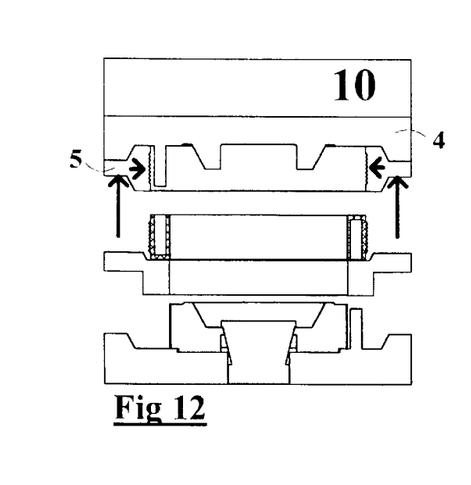
Figure 13:
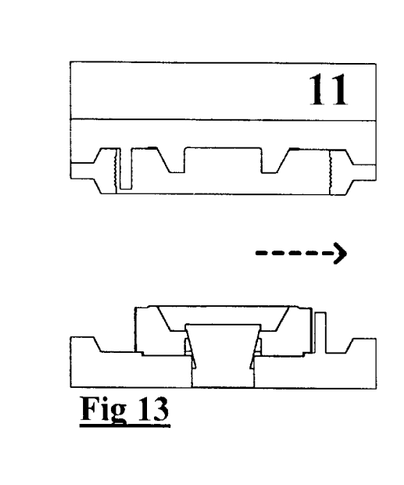
Figure 14:
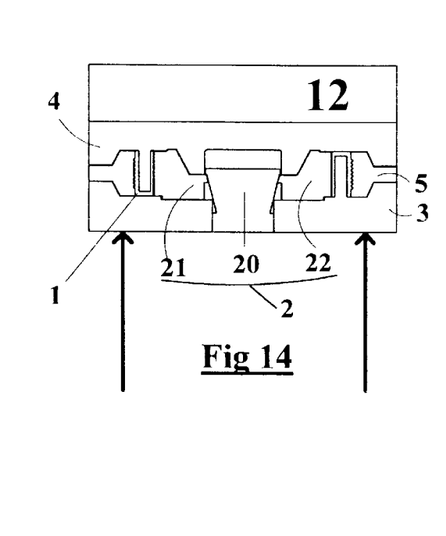

One advantage of the device of the invention is the great simplicity of movement of the handling tool 10, since it can remain in the same horizontal plane. That characteristic is linked to the vertical arrangement of the axis of the mold and to the fact that the movable shell 3 is the lower shell, which enables it to take up the belt presented in an appreciably fixed plane by the handling tool 10. It can, however, be observed that if the belt 11 is rigid enough and well guided, its positioning in the mold can alternatively be ensured by gravity after opening of the handling tool 10, which is centered above the core (FIGS. 7 to 8). That alternative consists, in fact, of dropping the belt around the core situated lower instead of raising the core in order to place it in the center of the belt maintained at a fixed height by the handling tool 10. That alternative then makes possible a reverse arrangement of the mold, in which the lower shell is stationary and the upper shell is movable.

Distributing the fingers 30, 40 on both sides of the molding cavity (see FIG. 2) has an advantage from the standpoint of mold stripping, for when the shells 3 and 4 are separated from each other, the mold stripping effort is appreciably symmetrical, which limits the deformations of the support. However, other configurations are entirely possible.

One advantage of this process over that of the state of the art clearly appears on looking at all of the figures: the operations of FIGS. 7 to 10 take place before the finished support 8 is completely stripped from the mold and removed, that is, its reticulation can continue under good conditions, even though the following cycle of manufacture of a new support has already started. Thus, the immobilization time of the press necessary for introduction of the reinforcing belt is no longer "wasted," but rather taken advantage of for reticulation. Furthermore, the heat exchange of the mold with the ambient air is reduced by the prolonged presence of the support in the mold. Another advantage pertains to the dependence of the machine on the availability of labor. In fact, even if undertaking the unloading of the molded support from the handling tool 10 and loading of a reinforcing belt in the handling tool 10 manually, those two operations, taking place outside the mold, can be conducted at any time between removal and introduction of the handling tool in the opening volume of the mold, as those operations are not tied to the cycle of the machine. Several minutes can thus be taken to carry out those operations without the work of the press thereby being affected. One can also use several handling tools designed to serve one or more presses and to afford great flexibility in organization of the work of the person in charge of setting the prefabricated belts in place and of unloading the finished supports. Furthermore, as the manual operations take place outside the molds, the temperature of which can be very high, the comfort and safety of the workers are improved. That work can also be carried out by a robot.

Although the invention has been described in a preferred embodiment, making possible substantial manufacturing automation, thanks, in particular, to use of the handling tool 10, the method and device of the invention are also of great interest in manual operation, that is, without a handling tool 10. In fact, the operations of mold stripping and removal of the molded support are greatly facilitated and speeded up by the invention. More than a gain in terms of cycle time, the use of the handling tool 10 makes possible an independence of the press cycle from the immediate availability of labor.

The embodiments described in the drawings concern presses having their axis vertical. However, the invention pertains also to horizontal presses, the main difference being in the possible use of gravity.

I claim:

1. A method of manufacturing a support intended to be mounted on a tire rim of a vehicle, said support having an axis A, a base limited by a cylindrical radially inner face intended to be mounted on said rim, a crown intended to bear the load and a body joining said base to said crown, said base comprising a substantially inextensible circumferential reinforcement, said body containing a plurality of axial recesses in at least one side of said support, said manufacturing process using a mold of axis corresponding to said axis A, and the said mold comprising:

an inner core for molding said radially inner face;

a crown molding ring comprising at least two component parts radially mobile relative to each other, the said component parts molding a radially outer face of said crown;

at least one shell bearing a plurality of axial fingers for laterally molding said body and said recesses;

said core, said ring and said shell cooperating in order to define, at least in part, a closed molding cavity for molding said support, the said core, comprising at least two component parts and being capable of taking a molding configuration in which said component parts form a circumferentially continuous molding surface for molding said radially inner face, the molding surface being defined by a reference diameter $\phi$ corresponding to the inner diameter of said support, the said core also being capable of taking a mold stripping configuration, defined by an overall length E around said molding surface less than the product of the number $\pi$ and reference diameter $\phi$, and said method comprising the following steps:

placing a belt containing the said circumferential reinforcement around said core;

establishing the molding configuration of said core;

closing the mold;

forcing an injectable material under pressure into said mold;

opening the mold;

establishing the mold stripping configuration of said core;

removing said molded support;

wherein, in a given manufacturing cycle, said belt is introduced in a volume described by the opening motion of said mold before a support molded on a previous manufacturing cycle is removed from said mold.

2. A method according to claim 1, wherein in a given manufacturing cycle, said belt is placed around said core before a support molded on a previous manufacturing cycle is removed from said mold.

3. A method according to claim 1, wherein said axis of said mold, being substantially vertical, said core, said shell and said ring having relative motions along said axis on opening of the mold, said molded support is maintained, after its molding, after opening of the mold and before its removal, in contact with at least one wall of said molding cavity and in a vertically higher position than a mid-plane of said volume described by said opening motion.

4. A method according to claim 3, wherein said belt being introduced by means of a handling tool, the support molded during said previous cycle is removed by means of said handling tool.

5. A method according to claim 4, wherein the introduction of said belt and the removal of said molded support are carried out by a generally horizontal displacement of said handling tool.

6. The method according to claim 3 wherein said at least one wall of said molding cavity is the molding surface of said crown molding ring.

* * * * *